Oct. 21, 1930.

C. S. BRAGG ET AL

POWER ACTUATOR

Re. 17,833

Original Filed June 26, 1924

3 Sheets-Sheet 1

INVENTORS
Caleb S. Bragg
Victor W. Kliesrath
BY
Louis Pierce Whittemore
ATTORNEY Oct. 21, 1930.

C. S. BRAGG ET AL

POWER ACTUATOR

Re. 17,833

3 Sheets-Sheet 2

Original Filed June 26, 1924

Caleb S. Bragg and Victor N. Ahrenrath INVENTORS

BY Louis Prevost Whitaker ATTORNEY

C. S. BRAGG ET AL

Oct. 21, 1930.

POWER ACTUATOR

Re. 17,833

3 Sheets-Sheet 3

Original Filed June 26, 1924

INVENTORS
Caleb S. Bragg and
Victor W. Kliesrath
BY
Louis Prevost Whitney
ATTORNEY Reissued Oct. 21, 1930

Re. 17,833

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

POWER ACTUATOR

Original No. 1,592,918, dated July 20, 1926, Serial No. 722,487, filed June 26, 1924. Application for reissue filed December 24, 1927. Serial No. 242,464.

Our invention consists in the novel features hereinafter described, reference being had to the accompanying drawings which illustrate several embodiments of the same, selected by us for purposes of illustration, and the said invention is fully disclosed in the following description and claims.

In carrying out our invention we employ a power actuator especially adapted for use in brake mechanisms for automobiles and particularly with automobiles provided with brakes on all four of the supporting wheels, the actuator being provided with two pistons working in the same cylinder, each of which pistons is operatively connected with the brake mechanism for two wheels, preferably arranged opposite to each other at the same end of the chassis. The pistons are caused to move in the cylinder toward and from each other by establishing differential pressures between that portion of the cylinder between the pistons and the portions at each end of the cylinder on the opposite sides of the piston, and we provide throttling reversing valve mechanism connected with an operator operated device for controlling the movements of said pistons, the valve mechanism being constructed to maintain the pistons in balanced condition at any interjacent position of the valve mechanism between its limits of movement, so that the movements of the pistons and their connected brake mechanisms can be controlled with the utmost delicacy, while the operator is relieved from the exertion of actually operating the brake mechanism. The valve mechanism is also connected to one of the pistons by means permitting lost motion, so that in case of failure of the power, the said piston and its connected brake mechanism may nevertheless be operated directly by the operator. In the application of our improved mechanism to automobiles in which an internal combustion engine furnishes the propelling power, the internal combustion engine affords a convenient means of obtaining the differential pressures required. Thus, in the operation of an internal combustion engine, there is suction produced by the cylinders in drawing in the charges of explosive mixture between the cylinders and the throttle valve which is at its maximum when the engine is throttled down, and decreases as the throttle is opened. There is also high compression in the cylinders of the engine which is greatest when the throttle is wide open, and decreases as the throttle is closed. Our improved power actuator, can therefore, be readily operated by the suction from the intake manifold as the low pressure acting on one face of each piston, or by compressed gases from a cylinder of the engine providing the high pressure acting one one face of each piston and atmospheric air as the low pressure acting on the other face of each piston, or compressed gases from a cylinder of the engine may be employed as the high pressure and suction from the intake manifold may be employed as the low pressure. In practice, however, we find it most convenient and advantageous to employ the suction from the intake manifold for the low pressure and atmospheric air for the high pressure, as specifically shown in the accompanying drawings. Our present invention also contemplates means for preventing one of the pistons from movement in the cylinder and thereby holding out of operation the brake mechanism connected therewith, leaving the other piston to operate the brake mechanism connected to it so that in a four wheel brake mechanism for example, the operator operated part, as the foot lever, may be operated under normal conditions so as to apply only two of the brakes, as those for the rear wheels, while in an emergency, or when heavy braking action is required, the locked piston may be released so that both pistons will operate, and simultaneously apply the brakes of all four of the wheels, when required, and under the entire control of the operator. In some instances this may be accomplished by providing mechanical means for locking and unlocking the free piston not under the mechanical control of an operator operated part, and this result may be accomplished in other ways, as by providing an auxiliary valve for closing the communication between the opposite ends of the cylinder at times when only one piston and the brake mechanism connected therewith are to be employed, and by providing means, under the control of the operator, hereinafter described, for effecting the opening of said auxiliary valve when the operation of both pistons and the brake mechanism connected therewith, is required.

Referring to the accompanying drawings.

Figure 2:
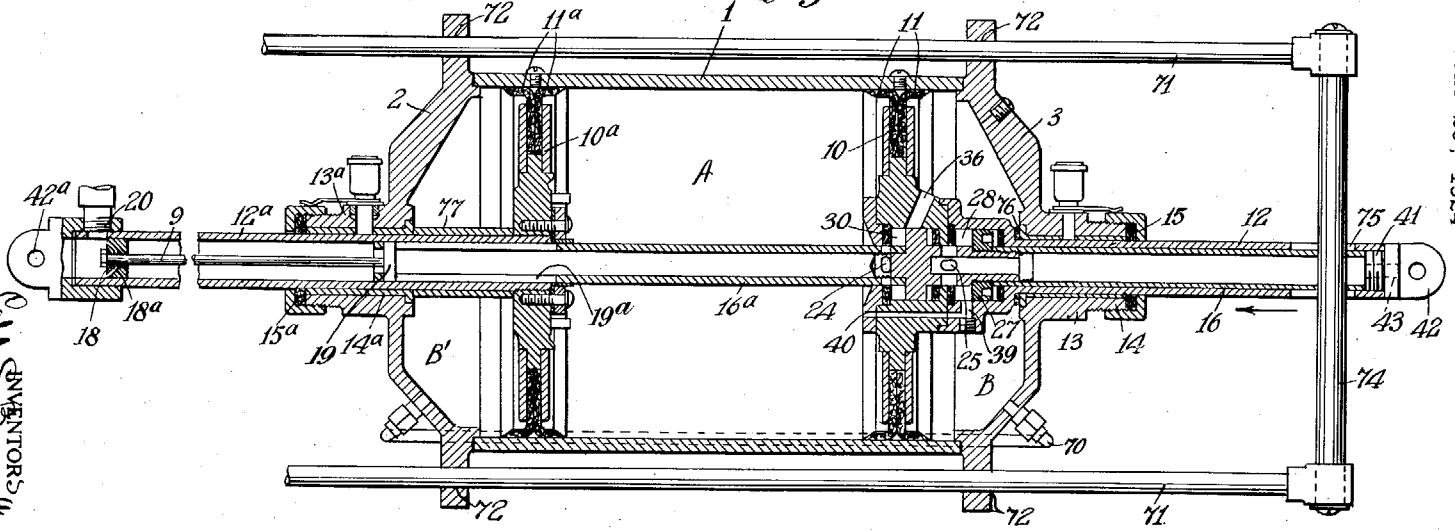
Fig. 2 is an enlarged sectional view of the double piston power actuator.

Fig. $2^a$ is a detail drawn to an enlarged scale showing the parts at the left of Fig. 2.

Fig. $2^b$ is a section on the line $2^b$—$2^b$ of Fig. $2^a$.

Figure 3:
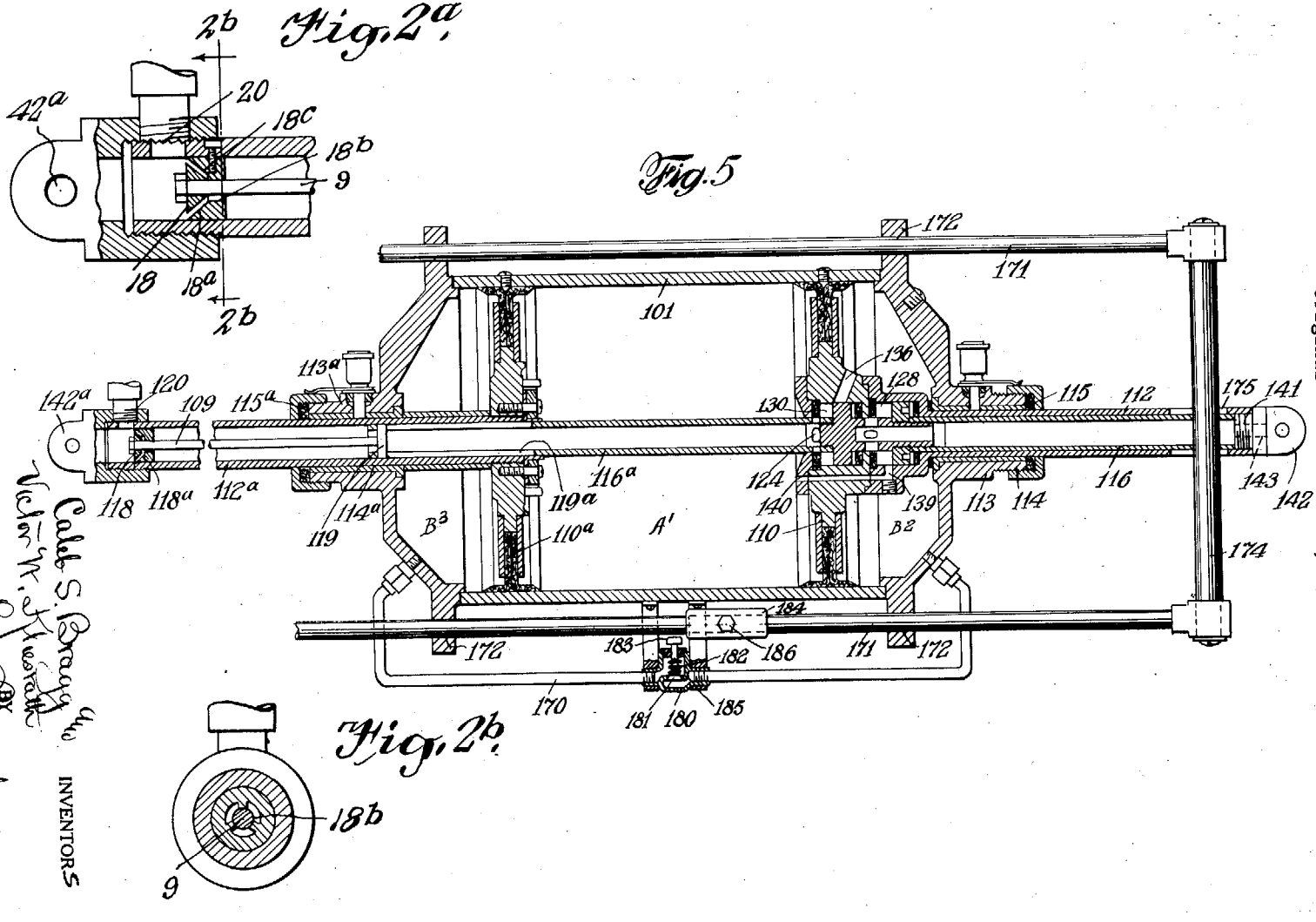
Figure 4:
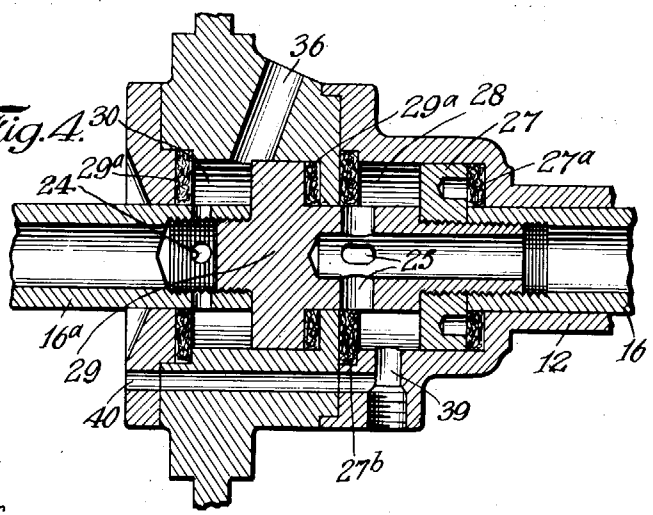
Figure 3:
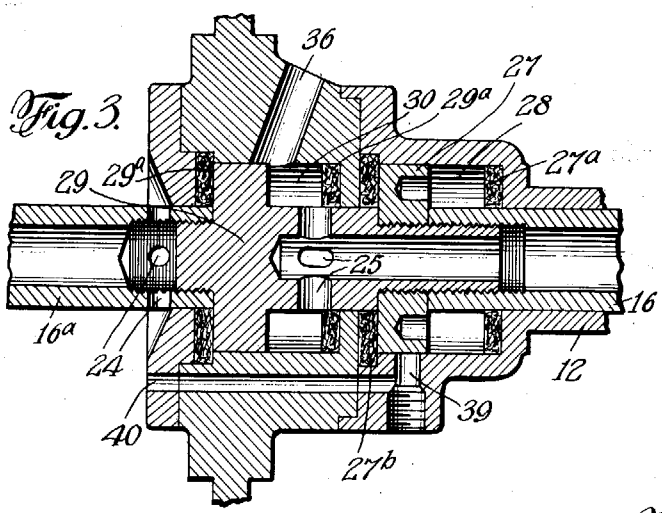

Figs. 3 and 4 are enlarged sectional views of a form of valve mechanism which may be conveniently employed in connection with the power actuator, showing the valve mechanism in reversed positions.

Fig. 5 is a detail sectional view of a part of a modified form of power actuator, in which an auxiliary valve and operator controlled cam for the same are employed for connecting and disconnecting the opposite ends of the cylinders, to enable the operator to employ one piston and the brake mechanism connected therewith or both pistons and their respective brake mechanisms as required.

Figure 6:
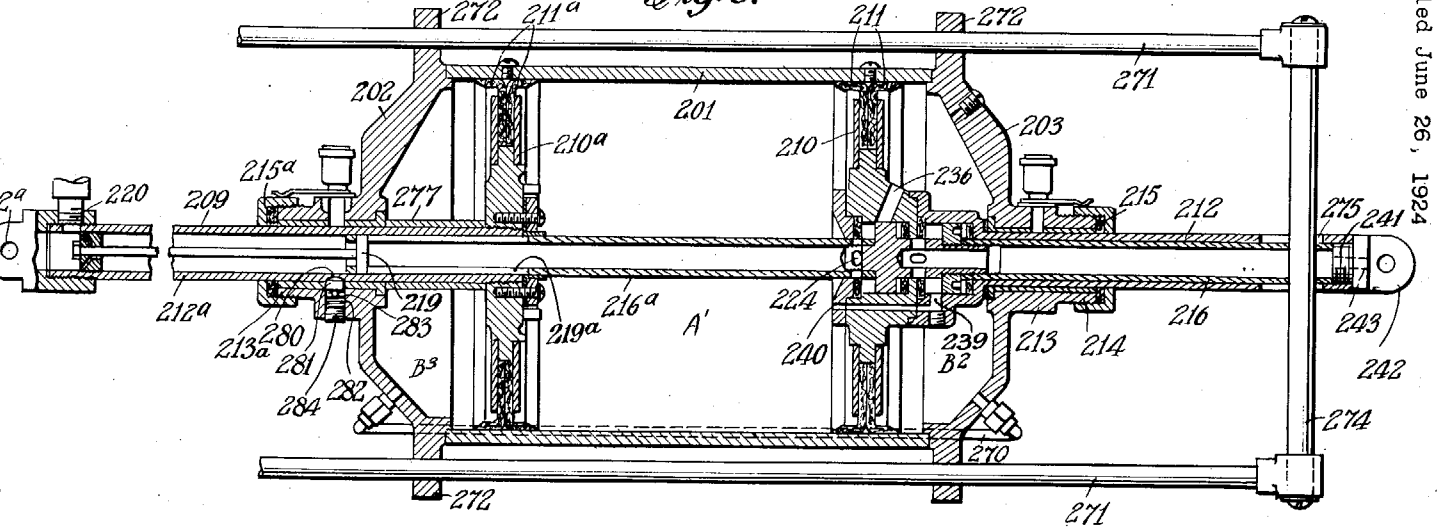

Fig. 6 is a detail view showing another modification of our improved actuator for enabling the operator to operate one or both pistons of the actuator as required.

Figure 1:
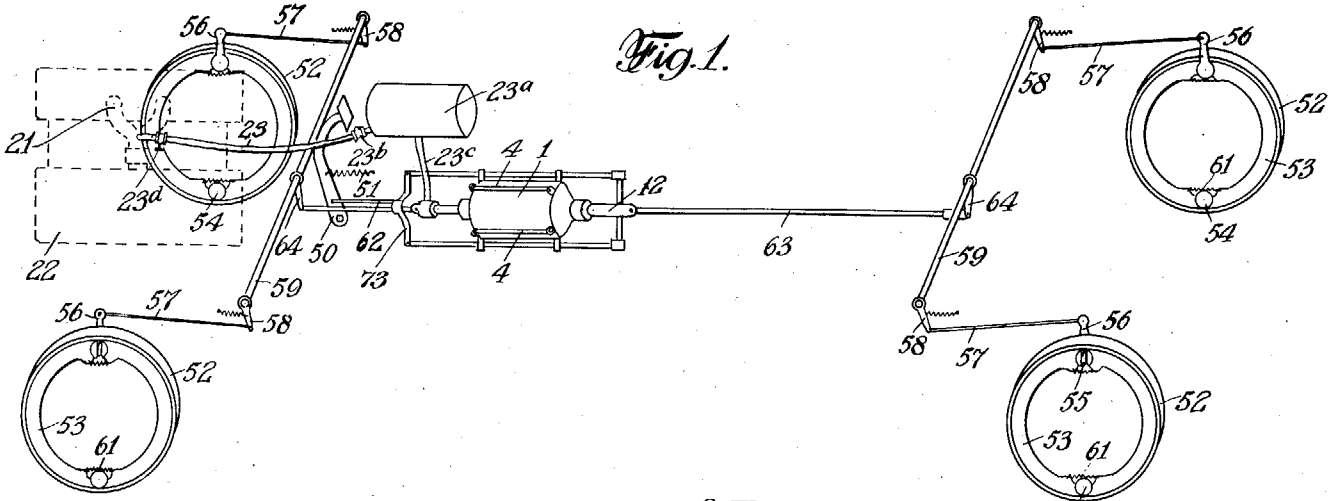
Fig. 1 is a diagrammatic view representing an automobile provided with four brakes, one for each of the wheels thereof, and having our improved double piston power actuator operatively connected therewith, and with the intake manifold of the engine for supplying the lower pressure for operating the power actuator.

Referring to the drawings, 1, represents the power cylinder of our improved power actuator, both ends being closed by suitable heads, indicated at 2—3, respectively, secured to the cylinder by any suitable means, as by connecting bolts and nuts, 4, see Fig. 1. Within the cylinder, 1, is a main double acting piston, indicated at 10, provided with annular gaskets, 11, extending in opposite directions and engaging the inner surface of the cylinder wall. The piston, 10, is provided with a hollow piston rod, 12, which extends through a guiding sleeve 13, bushing, 14, and stuffing box, 15, with which the head, 3, of the cylinder is provided. The cylinder is also provided with a second piston, $10^a$, which we term the auxiliary or floating piston, having similar gaskets, $11^a$, extending in opposite directions, and engaging the inner surface of the cylinder. The piston, $10^a$, is provided with a hollow piston rod, $12^a$, extending through a guiding sleeve, $13^a$, bushing, $14^a$, and stuffing box, $15^a$, with which the head, 2, of the cylinder is provided. The opposite ends of the cylinder are connected by means of a pipe, or passage, 70, so that one or both of said pistons may be actuated by creating different pressures in the space, A, between said pistons and the connected spaces, B—$B^1$, at the opposite ends of the cylinder. 16, $16^a$ represents a longitudinally movable valve sleeve extending in opposite directions from the throttling and reversing valve mechanism, which in this instance is located in the hub of the main piston, 10. The piston, 10, is provided with two chambers, indicated respectively at 28 and 30. The chamber, 28, is connected by passages, 39—40, with the central portion, A, of the cylinder between the pistons, while the chamber, 30, is connected by passage, 36, with the portion, B, in the end of the cylinder beyond the piston, 10, which, through the pipe or passage, 70, is connected to the portion, $B^1$. Within the chamber, 28, is a valve collar, 27, secured to the valve sleeve, which is ground to fit the interior of the chamber, 28, and is movable therein between end washers, $27^a$ and $27^b$, of leather or other suitable material, thus establishing a limit of lost motion amounting to substantially $\frac{7}{16}$ of an inch in this particular instance between the valve sleeve and the piston, 10. The portion, 16, of the valve sleeve, also communicates with a plurality of air inlet ports, 25, which can be brought into communication with the chamber, 28, when the valve, 27, is in one extreme position, and can be brought into communication with the chamber, 30, when the valve is in its other extreme position, the said ports, 25, being maintained closed when in an interjacent position between the limits of movement of the valve mechanism. Within the chamber, 30, the valve mechanism is provided with a collar valve, 29, ground to fit the wall of the chamber and movable within said chamber between end washers, $29^a$, and $29^b$, and the portion, $16^a$, of the valve sleeve is provided with a plurality of suction ports, indicated at 24, which are capable of being brought into communication with the chamber, 30, in one extreme movement of the valve mechanism and into communication with the central space, A, of the cylinder when in the other extreme position of the valve mechanism, said ports being normally closed when the valve mechanism is in an interjacent position. For convenience of reference we term the ports, 24, the low pressure ports, and the ports, 25, the high pressure ports.

In this instance, as shown in Figs. 1 and 2, the low pressure is supplied by suction from the intake manifold, 21, of the internal combustion engine, 22, of the automobile, which is connected to an inlet port, 20, in the exterior portion of the piston rod, $12^a$, by a flexible connection permitting the necessary movement of the piston rod. In order to insure the instantaneous operation of the brake mechanism without interference with idling of motor, etc., we prefer to interpose a vacuum tank between the intake manifold and the actuator, and in Fig. 1, we have shown such a tank at $23^a$, connected by a pipe, 23, with the intake manifold, said pipe being preferably provided with a regulating valve, $23^d$, adjacent to the manifold, and a check valve, $23^b$, adjacent to the tank. A flexible pipe, $23^c$, which may be of considerable diameter, extends from the tank, $23^a$, to the port, 20. Communication between the port, 20, and the low pressure ports, 24, is established through the hollow piston rod, $12^a$, and the movable valve sleeve section, $16^a$. In order to further provide for cutting off the suction when the pistons are in retracted positions, which is the normal or "off position" of the pistons, as indicated in Fig. 2, we prefer to provide the hollow piston rod, $12^a$, with a plug or partition, $18^a$, permanently secured therein adjacent to the port, 20, and provided with an axial aperture, $18^b$, and a valve seat, $18^c$, as best shown in Fig. $2^a$. We also provide a valve, 18, for engaging the valve seat, $18^c$, when the parts are in normal or "off" position, said valve being secured to a rod, 9, extending through the hollow rod and being connected to the sleeve section, $16^a$, by means providing lost motion, in this instance a wrist pin, 19, on the rod, 9, engaging a slot, $19^a$, in the sleeve section. When the pistons move away from each other and return to normal or retracted positions, as shown in Fig. 2, the wrist pin, 19, will be engaged by the end of the slot, $19^a$, in the sleeve, $16^a$, and this will draw the valve, 18, firmly upon its seat and form an additional sealing means, when the parts are not in operation. When the valve sleeve, $16^a$, is moved in the direction of the arrow in Fig. 2, the end of slot, $19^a$, relieves the wrist pin, 19, and permits the valve, 18, to open by suction, and it will be assisted in opening by the frictional engagement between the valve sleeve, $16^a$, and the wrist pin. The valve, 18, will remain open until it is closed by the return of the pistons and valve sleeve, $16^a$, to normal or retracted positions. The slot, $19^a$, permits the valve sleeve to move in the direction of the arrow in Fig. 2, to a greater or less extent as required, without interference from the valve rod, 9.

The higher pressure fluid in this instance is atmospheric air, which is admitted to the interior of the valve sleeve section, 16, through a port or opening, 43, at the outer end of the valve sleeve section, and preferably provided in a plug, 41, screwed into the outer end of the hollow piston rod, 12, and provided with perforated ears, 42, by which it is connected to one pair of brake mechanisms, as the brakes for the rear wheels of the automobile. The outer end of the other piston rod, $12^a$, is provided with similar ears, $42^a$, by which it is connected to the remaining brake mechanisms, as the brakes for the front wheels. In the present instance as shown in Fig. 1, the piston rod, 12, is connected by a link, 63, with an arm, 64, on a rock shaft, 59, provided with arms, 58, each of which is connected by a link, 57, to an arm, 56, for rotating forwardly a cam, 55, of one of the rear wheel brake mechanisms, which in this instance, is shown as comprising brake drums, 52, and separable braking shoes, 53, pivoted at 54, and provided with the usual retracting springs, 61. It is to be understood, further, that the particular form of brake mechanism and its connections with the actuator form no part of our present invention. The piston rod, $12^a$, is connected in a similar manner with the brake mechanisms for the forward wheels and the various parts of the brakes and connecting mechanisms are indicated by similar numerals.

50 represents the operator operated part which in this instance is the usual foot lever pivoted to the chassis and provided with a retracting spring, 51. This lever is connected to the longitudinally movable valve sleeve, 16, $16^a$, and the throttling and reversing valve mechanism by any usual or desired means. In the present instance we have shown the lever, 50, connected by a link rod, 62, with a rectangular frame comprising longitudinally movable slide rods, 71, engaging guiding apertures, 72, in parts secured to the cylinder heads and projecting therefrom, said rods being connected at their forward ends by cross rod, 73, extending around the piston rod, $12^a$, and being provided at their rear ends with a cross rod, 74, which extends through a slot, 75, in the piston rod, 12, and engages suitable apertures, in the sleeve, 16, so that the sleeve and valve mechanism, including the collar valves, 27 and 29, may be shifted longitudinally with respect to the piston, 10, by the operation of the foot lever, and in the reverse direction by the retracting spring, 51.

In the operation of the apparatus, as shown in Figs. 1, 2, 3 and 4 of the drawings, when it is desired to apply the brakes, the operator will depress the foot lever, 50, thereby shifting the sleeve, 16, and the reversing valve mechanism in the direction of the arrow in Fig. 2. This releases the valve, 18, from the retaining action of the rod, 9, and permits the valve to be opened by the suction, and simultaneously moves the low pressure ports, 24, into communication with the central space, A, of the actuator cylinder, and the high pressure ports, 25, into communication with the chamber, 30, as indicated in Fig. 3. The suction of the engine maintains a partial vacuum at all times in the suction tank and air will be immediately exhausted from the central space, A, of the cylinder, while atmospheric air will be admitted through the high pressure ports, 25, the passage, 36, and connecting pipe or passage, 70, to both ends of the cylinder, so that the pistons, 10 and 10ª, will move simultaneously toward each other and thereby simultaneously apply all four of the brake mechanisms connected therewith. It will be understood that if the pedal, 50, is moved forward and held, the movement above indicated of the pistons will instantly follow until the movement of the piston, 10, has covered the low pressure ports, 24, when the pistons will be maintained in a balanced condition until a further movement of the valve mechanism under the action of the pedal takes place. A further forward movement of the pedal is instantly followed by a further movement of the pistons toward each other so that the brake mechanism can be applied with the same accuracy and delicacy of adjustment that is obtained with the usual foot operated brake mechanism, except that the operator is relieved from the exertion necessary to actually apply the brakes. When the operator releases the pedal, 50, it will be moved in the opposite direction, by spring, 51, thereby shifting the valve sleeve and reversing valve mechanism so as to place the low pressure ports, 24, in communication with the chamber, 30, and the high pressure ports, 25, in communication with the passages, 39 and 40, leading to the space, A, between the pistons. The result of this will be to exhaust the air rapidly from the portions, B—B¹, of the cylinder and admit air to the central portion between the pistons which move away from each other and simultaneously release both sets of brakes. The movement of the piston, 10, is limited by the engagement of the hub (which is provided with a packing ring, 76, surrounding the piston rod, 12) with the head, 3, of the cylinder and the return movement of the piston, 10ª, is likewise limited by a projecting sleeve, 77, surrounding the piston rod, 12ª, and adapted to engage the other head, 2, of the cylinder, the said pistons being limited in order to prevent injury to their gaskets. As the pistons return to their normal positions the end of the slot, 19, in the valve sleeve, 16ª, will engage the wrist pin, 19, and exert a draw on the rod, 9, thereby drawing the valve, 18, firmly upon its seat and retaining it in closed position to assist in sealing the cylinder until the foot lever is again operated. The movement of the pistons toward each other will normally be limited by the application of the brakes. Should the brakes wear out the pistons will be prevented from coming into contact so as to injure their gaskets, by the engagement of their metallic hubs.

It will also be noted that by reason of the lost motion between the piston, 10, and the reversing valve mechanism, that if the brake pedal, 50, is actuated with sufficient pressure to bring the collar valves, 27 and 29, against the ends of the chambers, 28 and 30, the operator can apply his physical force through the brake pedal and the valve mechanism to the piston, 10, to further apply the brakes connected therewith by his physical force, and in case of failure of power the movement of the valves to this position, in taking up the lost motion between the operator operated part and piston, 10, would automatically vent the cylinder, by connecting it on both sides of the piston with the atmosphere, and the operator can then apply his physical force through the brake pedal and valve mechanism to directly move the piston, 10, and apply the brakes connected therewith by direct physical force of the operator, thereby preventing what otherwise might result in an accident. It is also to be noted that in the operation of our improved brake mechanism, by means of the herein described power actuator, the operator operates the brake pedal in exactly the same manner as to direction of movement and extent of movement as is usual in installations where the power is applied wholly by the operator so that it is unnecessary for the operator to learn a new mode of operation, while at the same time the brakes may be applied and released by the power actuator without any further exertion on the part of the operator than is required to move the brake pedal and connected valve mechanism against the pressure of the retracting spring.

Our invention also contemplates, as before stated the employment of means whereby one of the pistons, as the auxiliary or floating piston, 10ª, may be permitted to remain stationary while the main piston is operated, thereby effecting the operation of one set of brakes, only, and for releasing the said auxiliary or floating piston, to secure the simultaneous operation of the brake mechanisms connected with both pistons when required under the control of the operator. This is particulary advantageous in connection with an automobile having four wheel brakes as it enables the operator to apply the brakes of two wheels, as the rear wheels, under ordinary working conditions, and also to bring into action the brakes of all four wheels in any emergency, or when it is desired to make a sudden stop, or when additional braking power is required, as on very steep hills. In Fig. 5, we have shown a portion of the cylinder of the actuator, at 101, and the pistons are indicated at 110—110ª, respectively, it being understood that the parts of the actuator which are given the same reference numerals, with 100 added, are constructed in the same manner as is illustrated in Fig. 2 and hereinbefore described, except as hereinafter indicated. 170 represents the pipe or passage, connecting the end portions, $B^2$—$B^3$, of the cylinder, the central portion between the pistons being indicated at $A^1$. The pipe or passage, 170, is provided with a valve casing, indicated at 180, containing a spring actuated valve, 181, for closing the pipe or passage, 170, the said valve being normally held in closed position by a spring, 182, and being provided with a stem, 183, projecting from the valve casing into position to be engaged by a cam, 184, carried by one of the slide rods, 171, for actuating the valve sleeve, in the manner indicated in Fig. 2. The valve casing, 180, is provided with a partition, 185, interposed between the sections of the pipe, or passage, 170, leading from said valve to the opposite ends of the cylinder, 101, respectively, and is provided with a valve seat for the valve, 181. This valve is so located with respect to said seat that it will open against the tension of the spring, 182, when the portion, $B^2$, of the cylinder to the right of piston, 110, is connected with the source of lower pressure, (as the intake manifold of the engine by the valve mechanism of the actuator), while the light spring will maintain the valve normally in closed position at other times, except when the valve is positively opened by the cam, 184. The cam, 184, is preferably of substantially the same length as the stroke of the pistons, and is preferably adjustable on the rod, 171, so as to permit a certain amount of movement of said rod, sufficient to shift the valve mechanism of the actuator and secure effective operation of the main piston, 110, without engaging the stem, 183, of the valve, 181, with the cam, 184. The operator can therefore actuate the brake lever so as to secure the operation of the main piston, 110, and the brake mechanism (as the rear wheel brakes) operatively connected therewith, without producing effective movement of the auxiliary or floating piston, $110^a$, as the valve, 181, being in closed position, cuts off the space, $B^3$, of the cylinder from the space, $B^2$, and therefore atmospheric air cannot pass from the space, $B^2$, to the space, $B^3$, and the piston, $110^a$, will, accordingly be held from movement in the cylinder to permit the operation of the other piston and the brake mechanism connected therewith without operating the brake mechanism connected with piston, $110^a$, so held from movement. If it is required to operate all of the brakes, the operator can depress the brake lever to a further extent, thus moving the slide rods far enough to bring the cam, 184, into contact with the stem, 183, of the valve, 181, and opening said valve. This establishes communication for atmospheric air between the end spaces, $B^2$, $B^3$, of the actuator cylinder, and permits piston, $110^a$, to move inwardly toward the other piston, 110, and applies the brake mechanisms, connected therewith, thus applying all the brakes, as the front wheel brakes and rear wheel brakes. If the brake pedal is so actuated as to operate both pistons and set the brakes connected therewith, on the release of the brake pedal, the reversing valve will be shifted with respect to the ports of the main piston, 110, thus connecting the suction tank with the end portion, $B^2$, of the cylinder, while the central portion, $A^1$, is connected with the atmosphere. The air will be exhausted from the end portions, $B^2$, $B^3$, of the cylinder and both pistons will be returned to their normal positions, as the valve, 181, will be held open, as long as the cam, 184, remains in engagement with its stem, and after the cam releases the valve stem, the valve, 181, will be kept open by the suction against the action of its spring until the auxiliary or floating piston is fully returned to its normal position. The operator can, therefore, operate the brake pedal under ordinary conditions without bringing the cam, 184, into engagement with the valve, 181, to apply and release only the rear wheel brakes, but can instantly secure the operation of all the brake mechanisms controlled by both pistons by depressing the brake pedal sufficiently to bring the cam, 184, into operative engagement with the stem of the valve, 181, and opening said valve.

In Fig. 6 we have shown another modification of our improved actuator by means of which either one or both of the pistons may be operated as desired, under the control of the operator. In this figure, the parts are also constructed as shown in Fig. 2, except as hereinafter noted, and are given the same reference numerals with 200 added. In this figure, the piston rod, $212^a$, connected with the floating piston, is provided with a groove or recess, 280 adapted to be engaged by a rounded spring detent, 281, mounted in a recess, 282, in the sleeve, $213^a$, of the actuator cylinder, 202, and provided with a spring, 283, held in position by a screw plug, 284, screwed into the recess, 282, by means of which the tension of the spring may be adjusted. The engagement of the detent, 281, with the recess 280, in the piston rod, $212^a$, is such that the auxiliary or floating piston, $210^a$, will be normally held against movement when the valve mechanism of the actuator is moved into position to connect the central portion of the actuator cylinder with the suction, thus permitting the main piston connected with the valve sleeve, here indicated at $216^a$, to be actuated in either direction to apply and release the brakes connected therewith.

In case more than normal braking is required, a further depression of the brake pedal sufficient to actuate the valve sleeve, $216^a$, to its full extent (piston, 210, being arrested by the resistance of the applied brake mechanism connected therewith) will increase the suction within the central space, $A^2$, in the cylinder between the pistons. When the suction has increased sufficiently to enable the piston, $210^a$, to overcome the retarding influence of the detent, the latter will yield and be forced downward against its retracting spring, thus permitting the floating piston, $210^a$, to move inwardly and apply the brake mechanism connected therewith, as the front wheel brakes. When the reversing valve mechanism is shifted in the opposite direction by the brake pedal under the action of its retracting spring, both pistons will return to their normal position, and as soon as the auxiliary or floating piston, $210^a$, is moved far enough to bring the groove or recess, 280, into engagement with the detent, 281, the latter will spring into place and again lock the auxiliary piston. This construction, will, therefore, enable the operator to actuate one of said pistons, and the brake mechanism connected therewith, as the brakes for the rear wheels, or both pistons, and the brakes for all four wheels, as may be required.

The form of our invention illustrated in Fig. 6 is not specifically claimed herein, this embodiment being specifically claimed in another application for Letters Patent of the United States filed by us January 31, 1925, and given Serial No. 5,498, the said application being a division of this application, and since issued as Letters Patent No. 1,592,919, granted July 20, 1926.

What we claim and desire to secure by Letters Patent is:—

1. The combination of a power actuator comprising a cylinder closed at each end, two pistons movable independently of each other in both directions in said cylinder, the said cylinder being provided with a communicating passage connecting the opposite end portions of the cylinder on the outer faces of the pistons, means for establishing differential pressures within the central portion of the cylinder between said pistons and within said connected end portions, including a single throttling and reversing valve mechanism constructed to maintain said pistons in a balanced condition when the reversing valve mechanism is in an interjacent position between its limits of movement, an operator operated part connected with said valve mechanism, and brake mechanisms operatively connected with said pistons.

2. The combination of a power actuator comprising a cylinder closed at each end, two pistons movable independently of each other in both directions in said cylinder, the said cylinder being provided with a communicating passage connecting the opposite end portions of the cylinder on the outer faces of the pistons, means for establishing differential pressures within the central portion of the cylinder between said pistons and within said connected end portions, including a single throttling and reversing valve mechanism constructed to maintain said pistons in a balanced condition when the reversing valve mechanism is in an interjacent position between its limits of movement, an operator operated part connected with said valve mechanism, brake mechanism operatively connected with one of said pistons, and separate brake mechanism operatively connected with the other piston.

3. In a four wheel brake mechanism for automotive vehicles, the combination with a power actuator, comprising a cylinder, a pair of double acting pistons located therein, a communicating passage connecting the end portions of the cylinder on the outer faces of the pistons, means for establishing a differential of pressures within the central portion of the cylinder between said pistons and within said connected end spaces, including a single throttling and reversing valve mechanism constructed to maintain said pistons in a balanced condition when in interjacent position between the limits of movement of said valve mechanism, brake mechanism for the non-steering wheels connected with one of said pistons, brake mechanism for the steering wheels connected with the other piston, and an operator operated device connected with said valve mechanism.

4. The combination with a power actuator comprising a cylinder, a pair of double acting pistons working therein, said cylinder having a communicating passage connecting the end portions of the cylinder on the outer faces of said pistons, means for establishing a differential of pressures within the central portion of the cylinder between said pistons and within said connected end portions, including a single throttling and reversing valve mechanism constructed to maintain said pistons in balanced condition when the valve mechanism is in an interjacent position between the limits of its movement, brake mechanism connected with each of said pistons, and an operator operated part connected to said reversing valve mechanism, said valve mechanism being provided with a movable part connected with one of said pistons by means providing lost motion, whereby on the failure of power, said piston may be directly actuated by said operator operated part.

5. The combination of an actuator comprising a cylinder closed at its ends, a pair of double acting pistons in said cylinder, said cylinder being provided with a communicating passage connecting the end portions on the outer faces of said pistons, means for establishing differential pressures in the central portion of the cylinder between said pistons and the said connected end portions, including reversing valve mechanism located in one of said pistons, said valve mechanism including a part connected with the said piston by means permitting lost motion, a hollow piston rod connected with said main piston and extending through the adjacent end of the cylinder, an independent piston rod connected to the other piston and extending through the adjacent end of the cylinder, a longitudinally movable valve sleeve connected with the movable part of said reversing valve and having portions extending longitudinally through both of said hollow piston rods, brake mechanism connected with each of said piston rods, an operator operated part, and connections therefrom to said sleeve, and a retracting spring for said operator operated part.

6. The combination with a power actuator, comprising among its members, a power cylinder closed at both ends, a pair of double acting pistons in said cylinder, said cylinder being provided with a communicating passage for connecting the end portions of the cylinder on the outer faces of said pistons, a hollow piston rod extending through one end of the cylinder and connected to one of said pistons, and provided with an inlet aperture, a longitudinally movable reversing valve sleeve extending through said piston and the hollow piston rod thereof, and provided with separated ports, certain of said ports being connected to said inlet aperture, and other ports separated therefrom being adapted to be connected to an outlet passage from said cylinder, said piston being provided with ports and passages for connecting either of said separated ports with the portion of the cylinder between the pistons and the connected portions of the cylinder at the opposite ends thereof, valves carried by said sleeve for controlling said piston ports and sleeve ports, and adapted when in an interjacent position between the limits of movement of said sleeve with respect to said piston to maintain the pistons in balanced condition, a piston rod connected with the other of said pistons, brake mechanisms connected with said piston rods, an operator operated part, and connections between the same and said sleeve.

7. The combination with a power actuator, comprising among its members, a power cylinder closed at both ends, a pair of double acting pistons in said cylinder, said cylinder being provided with a communicating passage for connecting the end portions of the cylinder on the outer faces of said pistons, a hollow piston rod extending through one end of the cylinder and connected to one of said pistons, and provided with an inlet aperture, a longitudinally movable reversing valve sleeve extending through said piston and hollow piston rod thereof, and provided with separated ports, certain of said ports being connected to said inlet aperture, and other ports separated therefrom being adapted to be connected to an outlet passage from said cylinder, said piston being provided with ports and passages for connecting either of said separated ports with the portion of the cylinder between the pistons and the connected portions of the cylinder at the opposite ends thereof, valves carried by said sleeve for controlling said piston ports and sleeve ports, and adapted when in an interjacent position between the limits of movement of said sleeve with respect to said piston to maintain the pistons in balanced condition, a hollow piston rod connected with the other of said pistons, brake mechanisms connected with said piston rods, said sleeve extending longitudinally through the hollow piston rod of the other piston, and said latter piston rod being provided with an outlet aperture adapted to communicate with said sleeve, an operator operated part, and connections therefrom to said sleeve for actuating the valve mechanism.

8. The combination with a power actuator, comprising among its members, a power cylinder closed at both ends, a pair of double acting pistons in said cylinder, said cylinder being provided with a communicating passage for connecting the end portions of the cylinder on the outer faces of said pistons, a hollow piston rod extending through one end of the cylinder and connected to one of said pistons, and provided with an inlet aperture, a longitudinally movable reversing valve sleeve extending through said piston and the hollow piston rod thereof, and provided with separated ports, certain of said ports being connected to said inlet aperture, and other ports separated therefrom being adapted to be connected to an outlet passage from said cylinder, said pistons being provided with ports and passages for connecting either of said separated ports with the portion of the cylinder between the pistons and the connected portions of the cylinder at the opposite ends thereof, valves carried by said sleeve for controlling said piston port and sleeve port, and adapted when in an interjacent position between the limits of movement of said sleeve with respect to the piston to maintain the said pistons in balanced condition, a piston rod connected to the other of said pistons, brake mechanisms connected with said piston rods, an operator operated part, connections therefrom to said sleeve including a part passing through one of said hollow piston rods, said piston rod being longitudinally slotted to permit of the movement of said connecting part with respect thereto.

9. The combination with a power actuator comprising a cylinder, a pair of double acting pistons movable therein, said cylinder being provided with a communicating passage connecting the end portions of the cylinder on the outer faces of said pistons, means for establishing differential pressures in the central portion of the cylinder between said pistons and said connected end portions, including reversing valve mechanism constructed to maintain said pistons in balanced condition when in an interjacent position between the limits of movement of the valve mechanism, brake mechanism operatively connected with one of said pistons, independent brake mechanism connected with the other piston, an operator operated device connected with said reversing valve mechanism, and means for holding one of said pistons from movement in the cylinder while permitting the operation of the other piston and the brake mechanism connected therewith without operating the brake mechanism connected with the piston so held from movement.

10. The combination with a power actuator comprising a cylinder, a pair of double acting pistons movable therein, said cylinder being provided with a communicating passage connecting the end portions of the cylinder on the outer faces of said pistons, means for establishing differential pressures in the central portions of the cylinder between said pistons and said connected end portions, including reversing valve mechanism constructed to maintain said pistons in balanced condition when in an interjacent position between the limits of movement of the valve mechanism, brake mechanism operatively connected with one of said pistons, independent brake mechanism connected with the other piston, and an operator operated part for effecting the operation by power of one of said pistons and the brake mechanism connected therewith or both of said pistons and their connected brake mechanisms simultaneously, as required.

11. The combination with a power actuator comprising a cylinder, a pair of double acting pistons movable therein, said cylinder being provided with a communicating passage connecting the end portions of the cylinder on the outer faces of said pistons, means for establishing differential pressures in the central portion of the cylinder between said pistons and said connected end portions, including reversing valve mechanism constructed to maintain said pistons in balanced condition when in an interjacent position between the limits of movement of the valve mechanism, brake mechanism operatively connected with one of said pistons, independent brake mechanism connected with the other piston, a normally closed auxiliary valve in said communicating passage for enabling one of said pistons and its connected brake mechanisms to be operated without the other when desired, an operator operated part connected with the reversing valve mechanism, and means operatively connected with said operator operated part for holding said auxiliary valve in open position to effect the simultaneous actuation of both pistons and their connected brake mechanisms.

12. The combination with a power actuator comprising a cylinder, a pair of double acting pistons movable therein, said cylinder being provided with a communicating passage connecting the end portions of the cylinder on the outer faces of said pistons, means for establishing differential pressures in the central portion of the cylinder between said pistons and said connected end portions, including reversing valve mechanism constructed to maintain said pistons in balanced condition when in an interjacent position between the limits of movement of the valve mechanism, brake mechanism operatively connected with one of said pistons, independent brake mechanism connected with the other pistons, a normally closed spring actuated auxiliary valve located in the communicating passage between the ends of the cylinders and adapted to be opened automatically against the action of its spring when the reversing valve is in one position, a movable cam for opening said auxiliary valve and holding it in open position, an operator operated device, and connections therefrom to said reversing valve and to said cam.

13. The combination with a power actuator comprising a cylinder, a pair of double acting pistons movable therein, said cylinder being provided with a communicating passage connecting the end portions of the cylinder on the outer faces of said pistons, means for establishing differential pressures in the central portion of the cylinder between said pistons and said connected end portions, including reversing valve mechanism constructed to maintain said pistons in balanced condition when in an interjacent position between the limits of movement of the valve mechanism, brake mechanism operatively connected with one of said pistons, independent brake mechanism connected with the other piston, a normally closed spring actuated auxiliary valve located in the communicating passage between the ends of the cylinders and adapted to be opened automatically against action of its spring when the reversing valve is in one position, an operator operated device, connections therefrom to said reversing valve, and an adjustable cam connected with said operator operated device for actuating said auxiliary valve to open the same, said cam being normally out of operative relation with said auxiliary valve and permitting the operation of said reversing valve without bringing the cam into operative relation with the said auxiliary valve.

14. The combination with a power actuator comprising a cylinder, a pair of double acting pistons movable therein, said cylinder being provided with a communicating passage connecting the end portions of the cylinder on the outer faces of said pistons, means for establishing differential pressures in the central portion of the cylinder between said pistons and said connected end portions, including reversing valve mechanism constructed to maintain said pistons in balanced condition when in an interjacent position between the limits of movement of the valve mechanism, brake mechanism operatively connected with one of said pistons, independent brake mechanism connected with the other piston, a normally closed spring actuated auxiliary valve located in the communicating passage between the ends of the cylinders and adapted to be opened automatically against the action of its spring when the reversing valve is in one position, an operator operated part, operative connections therefrom to said reversing valve mechanism, including a longitudinally movable rod, and a cam for actuating said auxiliary valve to open the same, adjustably secured to said rod and normally out of operative relation with said auxiliary valve.

15. The combination of a power actuator, and means for connecting it with sources of higher and lower pressures, including a single controlling valve mechanism, means for connecting said actuator with independently operable brake mechanisms for a plurality of pairs of wheels of the vehicle for operating all of said brake mechanisms by power, under the control of said valve mechanism, an operator operated part operatively connected with said valve mechanism, and through the same to certain of said brake mechanisms less than the whole number operatively connected with the actuator, to enable the operator to apply his physical force to the brake mechanisms only connected with the operator operated part in addition to the power of the actuator, or to operate said last mentioned brake mechanisms by physical force alone in case of failure of power.

16. The combination of a power actuator, and means for connecting it with sources of higher and lower pressures, including a single controlling valve mechanism, means for connecting said actuator with independently operable brake mechanisms for a plurality of pairs of wheels of the vehicle for operating all of said brake mechanisms by power, under the control of said valve mechanism, an operator operated part operatively connected with said valve mechanism, and connections from portions of the valve mechanism connected with said operator operated part to certain of said brake mechanisms less than the whole number operatively connected with the actuator, to enable the operator to apply his physical force through said valve mechanism only to the brake mechanisms so connected with the operator operated part, in addition to the power of the actuator or to operate the said last mentioned brake mechanisms by physical force alone in case of failure of power.

17. The combination of a power actuator, and means for connecting it with sources of higher and lower pressures, including a single controlling valve mechanism, means for connecting said actuator with independently operable brake mechanisms for a plurality of pairs of wheels of the vehicle, including the steering wheels for applying all of said brake mechanisms by power, under the control of said valve mechanism, an operator operated part operatively connected with said valve mechanism, and through the same to the brake mechanisms for the non-steering wheels, to enable the operator to apply his physical force to the brake mechanisms for the non-steering wheels only, in addition to the power of the actuator or in case of failure of power.

18. The combination of a power actuator, and means for connecting it with sources of higher and lower pressures, including a single controlling valve mechanism, means for connecting said actuator with independently operable brake mechanisms for a plurality of pairs of wheels of the vehicle, including the steering wheels for applying all of said brake mechanisms by power, under the control of said valve mechanisms, an operator operated part operatively connected with said valve mechanism, and connections from portions of said valve mechanism connected with said operator operated part to the brake mechanisms for the non-steering wheels only, to enable the operator to apply his physical force through said valve mechanism to the brake mechanisms for the non-steering wheels, in addition to the power of the actuator or in case of failure of power.

19. The combination of a power actuator comprising a cylinder closed at each end, two pistons movable independently of each other, in both directions in said cylinder, the said cylinder being provided with a communicating passage connecting the opposite end portions of the cylinder on the outer faces of the pistons. means for establishing differential pressures within the central portion of the cylinder between said pistons and within the connected end portions thereof, including a single reversing valve mechanism constructed to maintain said pistons in a balanced condition when the reversing valve mechanism is in an interjacent position between its limits of movement, an operator operated part connected with said valve mechanism, and separate brake mechanisms operatively connected with said pistons, said valve mechanism including a valve casing and a valve actuating member movable with respect to each other, one of said relatively movable parts being connected with one of said pistons, and the other being connected with said operator operated part.

20. The combination of a power actuator comprising a cylinder closed at each end, two pistons movable independently of each other in both directions in said cylinder, the said cylinder being provided with a communicating passage connecting the opposite end portions of the cylinder on the outer faces of the pistons, means for establishing differential pressures within the central portion of the cylinder between said pistons and within the connected end portions thereof, including a single reversing valve mechanism constructed to maintain said pistons in a balanced condition when the reversing valve mechanism is in an interjacent position between its limits of movement, an operator operated part connected with said valve mechanism, brake mechanism operatively conected with one of said pistons, and independent brake mechanism independently connected with the other piston, said valve mechanism including a valve casing and a valve actuating member movable with respect to each other, one of said relatively movable parts being connected with one of said pistons, and the other being connected with said operator operated part, and means for limiting the relative movement between the said parts of said valve mechanism to enable the operator to apply his physical force to the brake mechanism only connected with the said piston to which the said portion of the valve mechanism is connected, in addition to the power of the actuator, or in case of failure of power.

21. The combination of a power actuator comprising a cylinder closed at each end, two pistons movable independently of each other, in both directions in said cylinder, the said cylinder being provided with a communicating passage connecting the opposite end portions of the cylinder on the outer faces of the pistons, means for establishing differential pressures within the central portion of the cylinder between said pistons and within the connected end portions thereof, including a single reversing valve mechanism constructed to maintain said pistons in a balanced condition when the reversing valve mechanism is in an interjacent position between its limits of movement, brake mechanisms for the steering wheels of the vehicle connected with one of said pistons, brake mechanisms for non-steering wheels of the vehicle connected with the other of said pistons, said valve mechanism including a valve casing and a valve actuating part movable with respect to each other, one of said relatively movable parts being connected with the brake mechanism for the non-steering wheels, and the other being connected with said operator operated part, and means for limiting the relative movement of said relatively movable parts to enable the operator to apply his physical force to the brake mechanism for the non-steering wheels in addition to the power of the actuator or on failure of power.

22. In an automotive vehicle provided with an internal combustion engine having a throttle controlled suction passage, the combination of a power actuator and means for connecting it with said suction passage and with a source of higher fluid pressure, including a single controlling valve mechanism, means for connecting said actuator with independently operable brake mechanisms for a plurality of pairs of wheels of the vehicle, for applying all of said brake mechanisms by power under the control of said valve mechanism, an operator operated part, and connections from said operator operated part to certain of said brake mechanisms less than the whole number operatively connected with said actuator and serving to operate said valve mechanism, to enable the operator to apply his physical force to the brake mechanisms only connected with said operator operated part, in addition to the power of the actuator or in case of failure of power.

23. In an automotive vehicle provided with an internal combustion engine having a throttle controlled suction passage, the combination of a power actuator and means for connecting it with said suction passage and with a source of higher fluid pressure, including a single controlling valve mechanism, means for connecting said actuator with independently operable brake mechanisms for a plurality of pairs of wheels of the vehicle including the steering wheels, for applying all of said brake mechanisms by power under the control of said valve mechanism, an operator operated part, and connections from said operator operated part to the brake mechanisms for non-steering wheels and serving to actuate said valve mechanism, to enable the operator to apply his physical force to the brake mechanisms for the non-steering wheels only, in addition to the power of the actuator or in case of failure of power.

24. In an automotive vehicle provided with an internal combustion engine having a throttle controlled suction passage, the combination of a power actuator and means for connecting it with said suction passage and with a source of higher fluid pressure, including a single controlling valve mechanism, means for connecting said actuator with independently operable brake mechanisms for a plurality of pairs of wheels of the vehicle including the steering wheels, for operating all of said brake mechanisms by power under the control of said valve mechanism, an operator operated part operatively connected with said valve mechanism, and connections from portions of said valve mechanism connected to said operator operated part to the brake mechanism for non-steering wheels, to enable the operator to apply his physical force to the brake mechanisms for the non-steering wheels only, in addition to the power of the actuator or in case of failure of power.

25. In an automotive vehicle provided with an internal combustion engine having a throttle controlled suction passage, the combination of a power actuator comprising a cylinder closed at each end, two pistons movable independently of each other, in both directions in said cylinder, said cylinder being provided with a communicating passage connecting the opposite end portions of the cylinder on the outer faces of the pistons, means for connecting the central portion of the cylinder between said pistons and said connected end portions of the cylinder, with said suction passage and with a source of higher pressure, including a single reversing valve mechanism constructed to maintain said pistons in a balanced condition when the reversing valve mechanism is in an interjacent position between its limits of movement, an operator operated part connected with said valve mechanism, and brake mechanism operatively connected with said pistons.

26. In an automotive vehicle provided with an internal combustion engine having a throttle controlled suction passage, the combination of a power actuator comprising a cylinder closed at each end. two pistons movable independently of each other, in both directions in said cylinder, said cylinder being provided with a communicating passage connecting the opposite end portions of the cylinder on the outer faces of the pistons, means for connecting the central portion of the cylinder between said pistons and said connected end portions of the cylinder, with said suction passage and with a source of higher pressure, including a single reversing valve mechanism constructed to maintain said pistons in a balanced condition when the reversing valve mechanism is in an interjacent position between its limits of movement, an operator operated part connected with said valve mechanism, separate brake mechanisms operatively connected with each of said pistons, and connections from portions of the valve mechanism connected with said operator operated part to certain of said brake mechanisms less than the whole number, to enable the operator to apply his physical force through said valve mechanism to the brake mechanism only connected with the operator operated part, in addition to the power of the actuator or in case of failure of power.

27. In an automotive vehicle provided with an internal combustion engine having a throttle controlled suction passage, the combination of a power actuator comprising a cylinder closed at each end, two pistons movable independently of each other, in both directions in said cylinder, said cylinder being provided with a communicating passage connecting the opposite end portions of the cylinder on the outer faces of the piston, means for connecting the central portion of the cylinder between said pistons and said connected end portions of the cylinder, with said suction passage and with a source of higher pressure, including a single reversing valve mechanism located in one of said pistons, constructed to maintain said pistons in a balanced condition when the reversing valve mechanism is in an interjacent position between its limits of movement, an operator operated part connected with said valve mechanism, brake mechanism operatively connected with one of said pistons, independent brake mechanisms connected with the other of said pistons, said operator operated part being operatively connected with the brake mechanisms which are connected to the piston in which said valve mechanism is located, to enable the operator to apply his physical force to said brake mechanisms only, in addition to the power of the actuator or in case of failure of power.

28. In an automotive vehicle provided with an internal combustion engine having a throttle controlled suction passage, the combination of a power actuator comprising a cylinder closed at each end, a main piston and an auxiliary piston both movable in both directions in said cylinder, said cylinder being provided with a communicating passage connecting the opposite end portions of the cylinder on the outer faces of the pistons, means for connecting the central portion of the cylinder between said pistons and said connected end portions of the cylinder, with said suction passage and with a source of higher pressure, including a single reversing valve mechanism constructed to maintain said pistons in a balanced condition when the reversing valve mechanism is in an interjacent position between its limits of movement, an operator operated part connected with said valve mechanism, independently operable brake mechanisms for a plurality of pairs of wheels of the vehicle including the steering wheels connected with said pistons, and operative connections from the operator operated part to the brake mechanisms for the non-steering wheels only, to enable the operator to apply his physical force to the brake mechanisms for the non-steering wheels in addition to the power of the actuator or in case of failure of power.

29. In an automotive vehicle provided with an internal combustion engine having a throttle controlled suction passage, the combination of a power actuator comprising a cylinder closed at each end, two pistons movable independently of each other, in both directions in said cylinder, said cylinder being provided with a communicating passage connecting the opposite end portions of the cylinder on the outer faces of the pistons, means for connecting the central portion of the cylinder between said pistons and said connected end portions of the cylinder, with said suction passage and with a source of higher pressure, including a single reversing valve mechanism located in one of said pistons and constructed to maintain said pistons in a balanced condition when the reversing valve mechanism is in an interjacent position between its limits of movement, an operator operated part connected with said valve mechanism, independently operable brake mechanisms for a plurality of pairs of wheels of the vehicle, including the steering wheels, and operative connections from portions of said valve mechanism connected to said operator operated part to the brake mechanisms for the non-steering wheels only, including a provision for lost motion sufficient to insure the operation of said valve mechanism, to enable the operator to apply his physical force through said valve mechanism to the brake mechanisms for the non-steering wheels, in addition to the power of the actuator or in case of failure of power.

30. In an automotive vehicle provided with an internal combustion engine having a throttle controlled suction passage, the combination of a power actuator comprising a cylinder closed at each end, two pistons movable independently of each other, in both directions in said cylinder, said cylinder being provided with a communicating passage connecting the opposite end portions of the cylinder on the outer faces of the pistons, means for connecting the central portion of the cylinder between said pistons and said connected end portions of the cylinder, with said suction passage and with a source of higher pressure, including a single reversing valve mechanism constructed to maintain said pistons in a balanced condition when the reversing valve mechanism is in an interjacent position between its limits of movement, an operator operated part connected with said valve mechanism, brake mechanisms operatively connected with said pistons, said valve mechanism comprising a valve casing and a valve actuating part movable relatively to said casing, one of said relatively movable parts being connected with said operator operated part.

31. In an automotive vehicle provided with an internal combustion engine having a throttle controlled suction passage, the combination of a power actuator comprising a cylinder closed at each end, two pistons movable independently of each other, in both directions in said cylinder, said cylinder being provided with a communicating passage connecting the opposite end portions of the cylinder on the outer faces of the pistons, means for connecting the central portion of the cylinder between said pistons and said connected end portions of the cylinder, with said suction passage and with a source of higher pressure including a single reversing valve mechanism located in one of said pistons and constructed to maintain said pistons in a balanced condition when the reversing valve mechanism is in an interjacent position between its limits of movement, an operator operated part connected with said valve mechanism, brake mechanism operatively connected with the piston in which said valve mechanism is located, independent brake mechanism independently connected with the other of said pistons, said valve mechanism including a valve casing and a valve actuating part movable relatively to the casing, one of said relatively movable parts being connected to the said pistons only in which said valve mechanism is located, and the other being connected with said operator operated part, and means for limiting the relative movement between said parts of said valve mechanism, to enable the operator to apply his physical force to the brake mechanism only connected with the said piston to which the said portion of the valve mechanism is connected, in addition to the power of the actuator or in case of failure of power.

32. In an automotive vehicle provided with an internal combustion engine having a throttle controlled suction passage, the combination of a power actuator comprising a cylinder closed at each end, two pistons movable independently of each other in both directions in said cylinder, said cylinder being provided with a communicating passage connecting the opposite end portions of the cylinder on the outer faces of the pistons, means for connecting the central portion of the cylinder between said pistons and said connected end portions of the cylinder, with said suction passage and with a source of higher pressure, including a single reversing valve mechanism constructed to maintain said pistons in a balanced condition when the reversing valve mechanism is in an interjacent position between its limits of movement, an operator operated part connected with said valve mechanism, brake mechanisms for the steering wheels of the vehicle connected with one of said pistons, brake mechanisms for non-steering wheels of the vehicle connected to the other of said pistons, said valve mechanism comprising a valve casing and a valve actuating part movable relatively to the casing, one of said relatively movable parts being connected to the piston connected with the non-steering wheel brake mechanisms, and the other being connected to said operator operated part, and means for limiting the relative movement of said relatively movable parts, to enable the operator to apply his physical force to the brake mechanisms for the non-steering wheels, in addition to the power of the actuator or in case of failure of power.

33. In an automotive vehicle provided with an internal combustion engine having a throttle controlled suction passage, the combination of a power actuator comprising a cylinder closed at each end, two pistons movable independently of each other, in both directions in said cylinder, said cylinder being provided with a communicating passage connecting the opposite end portions of the cylinder on the outer faces of the pistons, means for connecting the central portion of the cylinder between said pistons and the said connected end portions of the cylinder, with said suction passage and with a source of higher pressure including a single reversing valve mechanism located in one of said pistons and constructed to maintain said pistons in a balanced condition when the valve mechanism is in an interjacent position between its limits of movement, brake mechanism for the non-steering wheels of the vehicle connected with the piston containing said valve mechanism, brake mechanism for the steering wheels of the vehicle connected with the other of said pistons, an operator operated part, said valve mechanism comprising a valve casing and a valve actuating part movable relatively to the casing, one of said relatively movable parts being connected to the piston containing the valve mechanism and the other being connected to said operator operated part, and means for limiting the relative movement of said relatively movable parts, to enable the operator to apply his physical force to the brake mechanisms for the non-steering wheels in addition to the power of the actuator or in case of failure of power.

34. The combination of a power actuator comprising a cylinder closed at each end, two pistons movable independently of each other in both directions in said cylinder, the said cylinder being provided with a communicating passage connecting the opposite end portions of the cylinder on the outer faces of the pistons, means for establishing differential pressures within the central portion of the cylinder between said pistons and within said connected end portions, including a single throttling and reversing valve mechanism located in one of said pistons and constructed to maintain said pistons in a balanced condition when the reversing valve mechanism is in an interjacent position between its limits of movement, an operator operated part connected with said valve mechanism, and being also connected with the piston containing said valve mechanism by means providing lost motion, and brake mechanism operatively connected with said pistons.

35. The combination of a power actuator comprising a cylinder closed at each end, two pistons movable independently of each other in both directions in said cylinder, the said cylinder being provided with a communicating passage connecting the opposite end portions of the cylinder on the outer faces of the pistons, means for establishing differential pressures within the central portion of the cylinder between said pistons and within said connected end portions, including a single throttling and reversing valve mechanism located in one of said pistons and constructed to maintain said pistons in a balanced condition when the reversing valve mechanism is in an interjacent position between its limits of movement, an operator operated part connected with said valve mechanism, and being also connected with the piston containing said valve mechanism by means providing lost motion, brake mechanism operatively connected with one of said pistons, and separate brake mechanism operatively connected with the other of said pistons.

36. In an automative vehicle, the combination with a plurality of independently operable brake mechanisms, power operated means for said brake mechanisms, a single controlling valve mechanism therefor for applying all of said brake mechanisms by power, said valve mechanism being connected with certain of said independently operable brake mechanisms less than the whole number, and an operator operated part connected with said valve mechanism, whereby the operator can apply his physical force to the brake mechanism connected with said valve mechanism in addition to the force applied thereto by said power operated means, or to apply said brake mechanisms so connected with the operator operated part by physical force alone in case of failure of power.

37. In an automotive vehicle provided with an internal combustion engine having a suction passage, the combination with a plurality of independently operable brake mechanisms, power operated means for operating all of said brake mechanisms, means including a single controlling valve mechanism for placing said power operating means in communication with said suction passage and with the atmosphere under the control of said valve mechanism, connections between said valve mechanism and certain of said brake mechanisms less than the whole number, and an operator operated part connected with said valve mechanism, whereby the operator can apply his physical force through said valve mechanism to said brake mechanisms connected therewith in addition to the power exerted thereon by the power operated means, and can apply said brake mechanisms so connected with the operator operated part by physical force alone in case of failure of power.

38. The combination with a power actuator including a cylinder and a piston movable therein and means for connecting the actuator with sources of higher and lower pressures, including a controlling valve mechanism, means for connecting said actuator with independently operable brake mechanisms for a plurality of pairs of wheels of a vehicle for operating all of the brake mechanisms of said vehicle by power under the control of said valve mechanism, an operator operated part operatively connected to certain of said brake mechanisms less than the whole number operatively connected with the actuator, said valve mechanism being operatively connected with said operator operated part and a part moving with the piston of the actuator and controlled by both.

39. In an automotive vehicle, the combination with a plurality of independently operable brake mechanisms, power operated means for operating all of said brake mechanisms, a single controlling valve mechanism for said power operated means, an operator operated part, a connection therefrom to certain of said brake mechanisms less than the whole number and including a provision for lost motion, means directly actuated by said connection for operating said valve mechanism, whereby the operator can apply all of the brakes by the power operated means or apply his physical force to said certain brake mechanism in addition to the power exerted thereon by the power operated means and can operate said certain brake mechanism by his physical force alone in case of failure of power.

CALEB S. BRAGG.
VICTOR W. KLIESRATH.